(12) United States Patent
Chance et al.

(10) Patent No.: US 6,279,415 B1
(45) Date of Patent: Aug. 28, 2001

(54) METHOD AND APPARATUS FOR PROVIDING TENSION WITHIN A CABLE

(75) Inventors: Kenneth Edward Chance, Dearborn; Christopher Patrick Nolan, Redford; Celine Anne-Alice Verrier, Dearborn, all of MI (US)

(73) Assignee: Visteon Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/427,904

(22) Filed: Oct. 27, 1999

(51) Int. Cl.[7] .................................................... F16C 1/22
(52) U.S. Cl. ...................................... 74/501.5 R; 74/500.5
(58) Field of Search ........................... 74/501.5 R, 500.5, 74/502.4, 502.6

(56) References Cited

U.S. PATENT DOCUMENTS

| | | |
|---|---|---|
| 4,378,713 | 4/1983 | Haskell et al. . |
| 4,464,950 | * 8/1984 | Deligny ........................... 74/501.5 R |
| 4,682,760 | * 7/1987 | Baumgarten ................ 74/501.5 R X |
| 4,762,017 | * 8/1988 | Jaksic .................................. 74/500.5 |
| 4,872,367 | 10/1989 | Spease . |
| 4,917,418 | 4/1990 | Gokee . |
| 5,377,556 | 1/1995 | Byrnes . |
| 5,758,544 | 6/1998 | Lee . |

FOREIGN PATENT DOCUMENTS

| | | | |
|---|---|---|---|
| 234864 | * 9/1987 | (EP) | ................................ 74/501.5 R |
| 4-212687 | * 8/1992 | (JP) | ................................ 74/501.5 R |

* cited by examiner

*Primary Examiner*—Mary Ann Green
(74) *Attorney, Agent, or Firm*—Visteon Global Tech., Inc.

(57) ABSTRACT

An apparatus 10 for providing tension in a cable 12. Apparatus 10 includes a generally cylindrical housing 14, movable member 16 which is slidably disposed within housing 14 and a member 18 which is slidably disposed within member 16 and housing 14. Assembly 10 further includes a conventional spring or compression member 20 which is conventionally and operatively coupled to members 16 and 18, and is effective to impart opposing forces upon member 16 and member 18, thereby providing tension within cable 12.

11 Claims, 3 Drawing Sheets

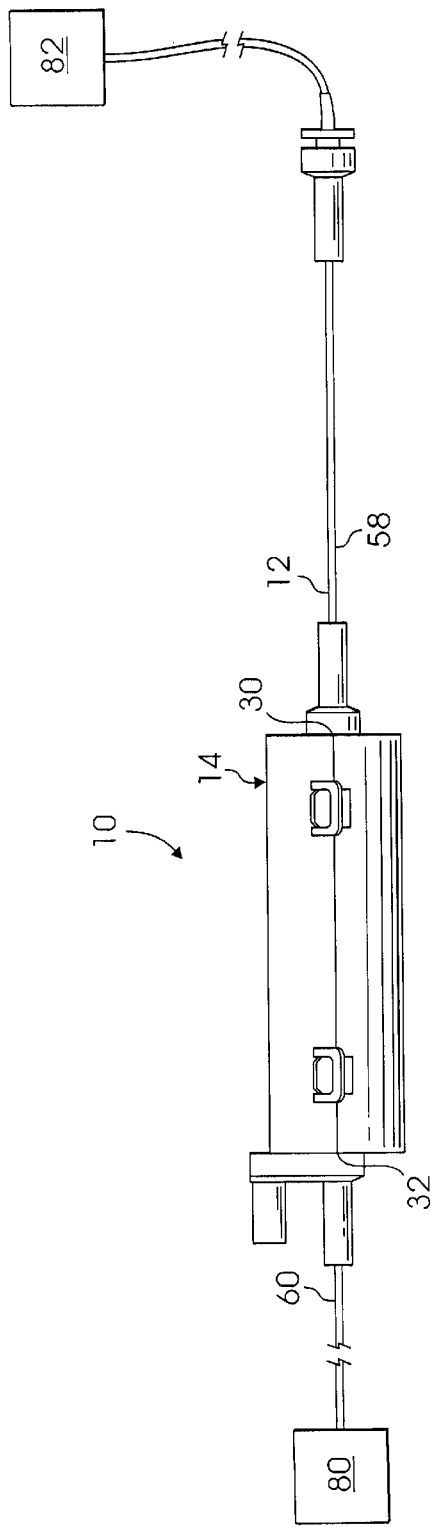
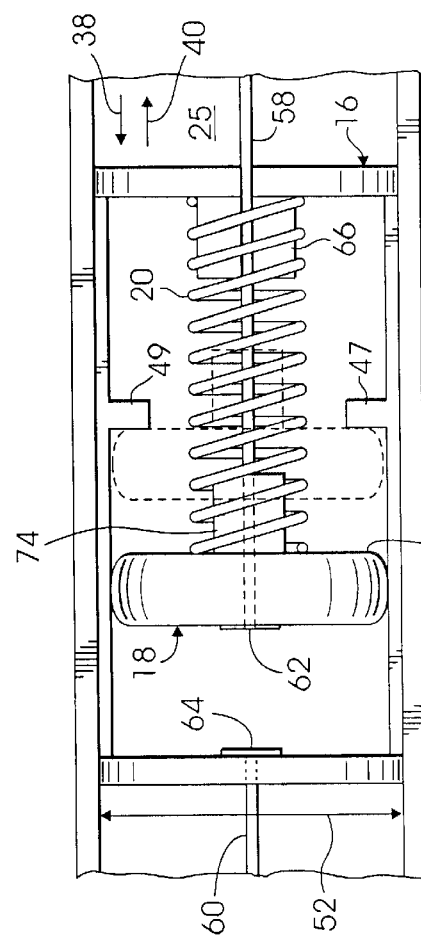

METHOD AND APPARATUS FOR PROVIDING TENSION WITHIN A CABLE

FIELD OF THE INVENTION

This invention relates to a method and an apparatus for providing tension within a cable and more particularly, to a method and an apparatus which automatically provides and maintains a desired amount of tension or tautness within a cable.

BACKGROUND OF THE INVENTION

Cables are used within automotive vehicles and other apparatuses to transfer force and/or motion from one portion of the vehicle or apparatus to other portions of the vehicle or apparatus. Particularly, these types of cables are generally and respectively attached to a device and/or assembly which is desired to be moved and/or actuated, such as and without limitation a braking mechanism, a fuel door, or a hood or trunk latch. Typically, a cable lever or actuator is also coupled to each of these cables and is typically disposed at a location which is relatively remote from the respective device which is to be actuated. By depressing, lifting or otherwise activating the lever or actuator, force and/or motion is transferred through the cable to the device, thereby desirably actuating the device (e.g., activating the brakes of the vehicle, or opening the fuel door, hood or trunk of the vehicle).

While these cables do desirably allow such devices and/or assemblies to be selectively actuated, these cables typically "stretch", expand, and/or "wear" over time, thus resulting in an undesirable amount of looseness or "play" within the cables. These cables are also subject to certain manufacturing variances and certain manufacturing tolerance variations which may further add to the looseness or "play" of the cables (e.g., some of these cables may be longer than is required, specified, and/or necessary to achieve their actuation function or purpose). Looseness within these cables undesirably and adversely effects the operation of the devices which are desired to be actuated. For example and without limitation, looseness or "play" within these cables typically causes the devices which are respectively driven by the "loose" cables to fail to promptly and/or properly actuate.

Various devices and apparatuses have been used to compensate for and/or to substantially eliminate the "slack" or looseness of these cables and to maintain a desired amount of tension or tautness within these cables. For example and without limitation, manually adjusted "mechanical type" devices have been implemented into and/or "operatively placed" within these cable driven devices and assemblies and are used to manually and selectively adjust the length of these cables. Although these devices do tighten and provide tension within the cables, they suffer from some drawbacks. Namely, these devices are required to be manually operated and often require the services of a skilled technician or repair person, thereby causing and/or resulting in an undesirable expense to the owner of the vehicle. This requirement also undesirably prevents the vehicle or device from being used or operated while the cables are being adjusted or serviced. Moreover, the undesirable situation unabatedly continues until the owner/operator of the vehicle causes the vehicle to be serviced.

There is therefore a need for a method and an apparatus for providing and maintaining a desired amount of tension and tautness within a cable, which automatically maintains a desired amount of tension or tautness without intervention of the owner/user of the vehicle, and which does not substantially require manual cable adjustment.

SUMMARY OF THE INVENTION

It is a first object of the invention to provide a method and an apparatus for providing and maintaining tension, tightness, or tautness within a cable which overcomes some or all of the previously delineated drawbacks of prior cable tensioning assemblies.

It is a second object of the invention to provide a method and an apparatus for automatically providing and maintaining tension or tautness within a cable.

It is a third object of the present invention to provide a method and an apparatus for automatically providing and maintaining tension or tautness within a cable, and which automatically compensates for "looseness" or "slack" caused by wear and manufacturing variances.

It is a fourth object of the present invention to provide a method and an apparatus for maintaining tension or tautness within a cable in a manner which does not require manual cable adjustment or servicing.

According to a first aspect of the present invention, an apparatus for providing tension or tightness within a cable is provided. The apparatus includes a first member which is coupled to a first portion of the cable; a second member which is coupled to a second portion of the cable and which is movable with respect to the first member; and a compression member which is coupled to the first member and to the second member, the compression member being effective to force the first member and the second member to move in opposing directions, thereby forcing the first portion to move toward the second portion and providing tension within the cable.

According to a second aspect of the present invention, a method for providing tension within a cable having a first portion and a second portion is provided. The method includes the steps of: providing a first member; coupling the first member to the first portion of the cable; providing a second member; movably disposing the second member relative to the first member; coupling the second member to the second portion of the cable; providing a spring; and compressibly disposing the spring between the first member and the second member, effective to force the first portion toward the second portion, thereby providing tension within the cable.

These and other objects, aspects, features, and advantages of the present invention will become apparent from a consideration of the following specification and the attached drawings.

BRIEF DESCRIPTION OF THE DRAWINGS

FIG. 2 is a side assembled view of the apparatus shown in FIG. 1 shown operatively employed within a cable actuating assembly;

FIG. 3 is a top partial sectional view of the apparatus shown in FIG. 1;

DETAILED DESCRIPTION OF THE PREFERRED EMBODIMENT OF THE INVENTION

Figure 1:
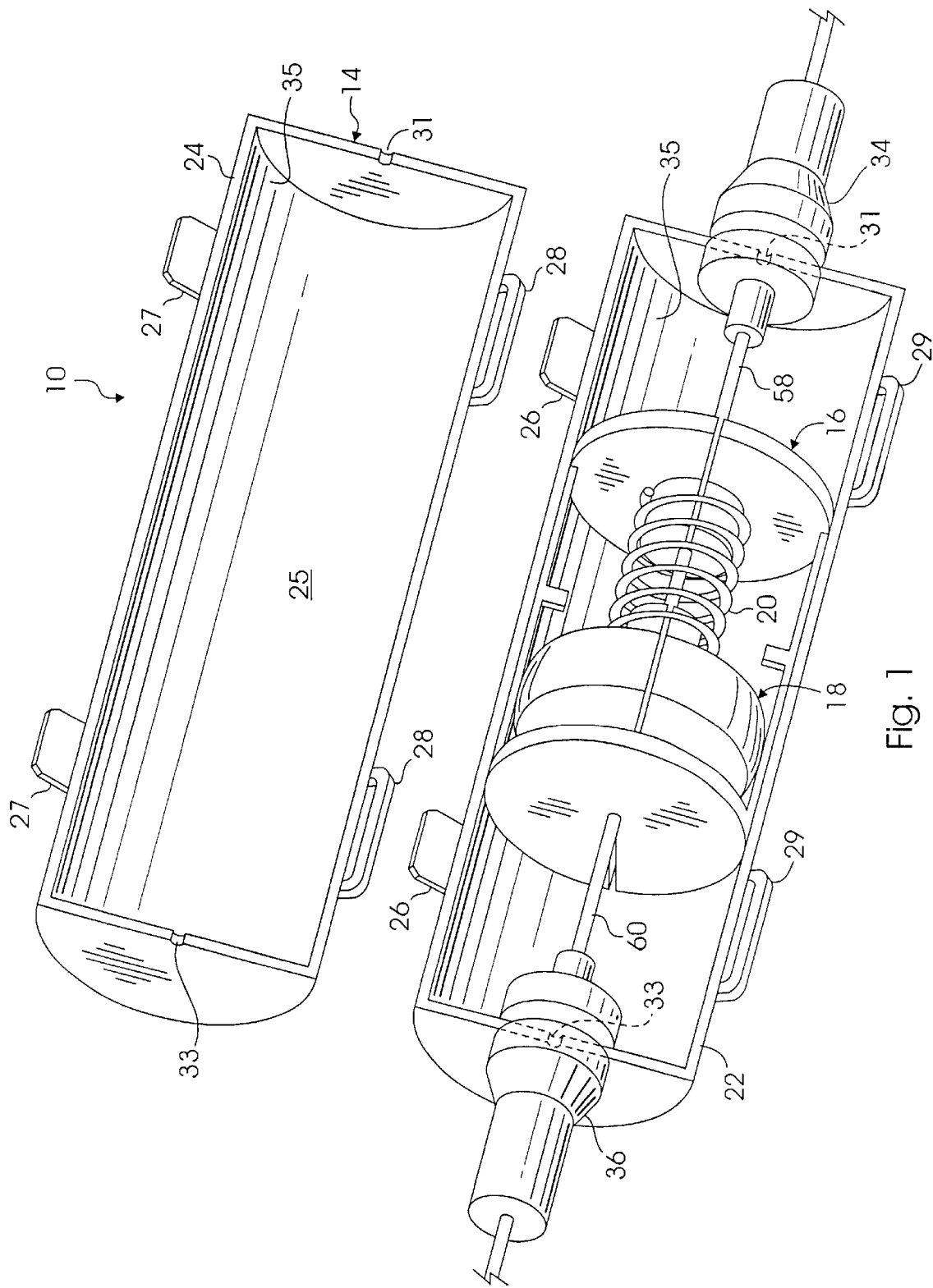
FIG. 1 is an unassembled perspective view of a cable tensioning apparatus which is made in accordance with the teachings of the preferred embodiment of the invention.

Referring now to FIGS. 1–5, there is shown an apparatus 10 for providing tension, tightness, or tautness within a cable 12, such as that used within a vehicle, and which is made in accordance with the teachings of the preferred embodiment of the invention. As shown, apparatus 10 includes a generally cylindrical housing 14, a first member 16 which is slidably and/or moveably disposed within housing 14, and a second movable member or "piston type" portion 18 which is slidably engaged with and/or coupled to member 16. Assembly 10 further includes a compressible or "compression" member/element, such as a conventional spring 20, which is conventionally and operatively coupled to members 16 and 18. It should be realized that while the following discussion describes the operation of assembly 10 having a conventional spring 20, other types of selectively compressible members may be used to replace spring 20, provided that each of these alternate compression or selectively compressible members be adapted to force and/or to compressibly and selectively cause first and second cable portions, in the manner described below, to move in opposite directions, thereby increasing and/or providing tension/tautness and/or tightness within the cable 12.

Housing 14 is selectively formed and/or operatively assembled by the selective attachment of two substantially identical and generally elongated and substantially hollow and substantially cylindrical members or "halves" 22, 24 which are each preferably manufactured from a relatively strong, durable, and rigid material such as conventional and commercially available plastic, metal or a composite material. Particularly, members 22, 24 are selectively coupled or "joined together" by the use of two pairs of substantially identical and conventional fasteners 26, 27 which may comprise clips, pins, and/or screw assemblies. As shown, each member 22, 24 respectively has and/or integrally forms and/or integrally includes a pair of fasteners 26, 27. Each member 22, 24 further has respective and substantially identical integrally formed and/or integrally included apertures or slots 28, 29. Each of the fasteners 26 of member 20 are selectively received within and/or by a unique one of apertures/slots 28 and each fastener 27 of member 24 is received within and/or by a unique one of apertures/slots 29. Fasteners 26, 27 cooperate with apertures or slots 28, 29 to allow the members 22, 24 to be selectively and removably coupled. Members 22, 24 therefore cooperatively form a generally cylindrical channel or cavity 25 having a relatively smooth inner surface 35. Members 22, 24 further include two pairs of substantially identical, integrally formed, and semi-circular slots 31, 33, which, when members 22, 24 are joined, cooperatively form a pair of opposed and generally circular cable-receiving apertures 30, 32 which operatively receive and secure conventional cable terminals 34, 36 within and/or to housing 14.

Figure 4:
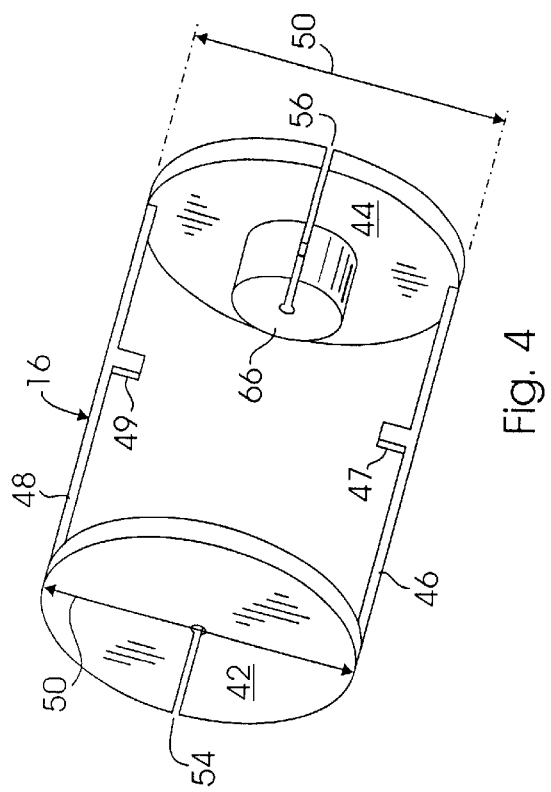
FIG. 4 is a perspective view of a first movable member employed within the apparatus shown in FIGS. 1–3.
Figure 5:
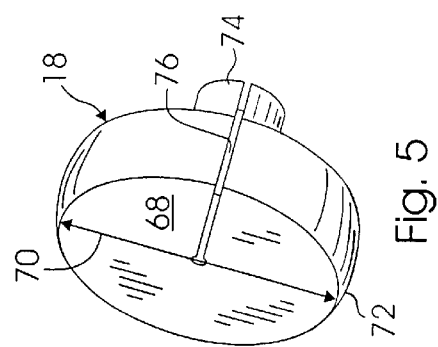
FIG. 5 is a perspective view of a second movable member employed within the apparatus shown in FIGS. 1–3.

Member 16 slidably engages surface 35 and is axially movable within channel 25 in the directions illustrated by arrows 38, 40. As best shown in FIG. 4, member 16 includes a pair of generally circular end portions 42, 44, which are fixedly attached to and/or which are integrally formed with a pair of generally elongated support members 46, 48. Each portion 42, 44 has a substantially identical diameter 50 which is slightly smaller than the diameter 52 of channel 25, thereby allowing member 16 to be movably secured within channel 25. Portion 42 includes a slot 54 which selectively receives a conventional end piece 64 which is attached to the cable segment or portion 60 which passes through terminal 36, and which removably secures end piece 64 to portion 42. Portion 44 includes a slot 56 which selectively receives the cable segment or portion 58 which passes through terminal 34, and a centrally disposed and generally cylindrical projection 66 around which a portion of compression member or spring 20 is securely attached and coiled. Portions 46 and 48 each include a pair of substantially identical, opposing, and orthogonally projecting ridges or "stops" 47, 49 which operatively limit the range of motion of member 18 as described more fully below.

Member 18 slidably engages members 46, 48 and is axially movable within and relative to member 16. Particularly, member 18 is movable in the directions illustrated by arrows 38, 40 between a first "extended" position in which spring 20 is substantially expanded, and a second "compressed" position in which member 18 abuttingly resides or rests upon ridges or stops 47, 49. Member 18 includes a generally circular portion 68 having a diameter 70 which in one non-limiting embodiment is less than or smaller than diameter 50. In the preferred embodiment of the invention, the outer periphery or edge 72 of portion 68 is "rounded" or semi-circular in shape. Portion 68 includes a generally cylindrical projection 74 around which a portion of spring 20 is securely attached and coiled, and a slot 76 which selectively receives end piece 62 which is coupled to the cable portion 58, and which removably secures end piece 62 to portion 68. As shown best in FIG. 3, projections 74 and 66 cooperate to "align" spring 20, thereby substantially preventing spring 20 from "bowing", bending, and/or otherwise obstructing the range of motion of member 18.

Spring 20 may comprise any type of conventional spring, such as coil spring, and may be operatively coupled to members 16 and 18 in any suitable manner. In the preferred embodiment of the invention, the strength of spring 20 is proportional to the amount of tension which is required and/or desired within cable 12.

Apparatus 10 is selectively and operatively inserted within a cable in which a certain amount of tension is necessary or desired, such as cable 12 which operatively connects an actuatable device 80 to a conventional actuator 82. It should be appreciated that cable 12, device 80, and actuator 82 may respectively represent any type of cable, device and/or actuator, and that the size, shape, and/or strength of the components of apparatus 10 may be conventionally modified and/or designed to correspond with and/or accommodate the specific type of cable, device and/or actuator in which apparatus 10 is to be used.

In order to operatively attach apparatus 10 to cable 12, cable 12 is severed, thereby creating portions 58, 60 which are respectively connected to actuator 82 and device 80. Conventional cable terminals 34, 36 are respectively attached to portions 58, 60, and end pieces 62, 64 are respectively and fixedly secured to the severed or "exposed" ends of portions 58, 60 which respectively pass through or traverse terminals 34, 36. It should be appreciated that the severed ends of portions 58, 60 may be trimmed or shortened to compensate for the "length" or distance added to cable 12 by the introduction of apparatus 10.

Housing 12 is "opened" and terminals 34, 36 are placed or fitted into slots 31, 33. End piece 62 is passed through spring 20 and is secured within slot 76. Spring 20 is then fitted around or otherwise coupled to portions 66 and 74, as best shown in FIGS. 1 and 3. End piece 64 is then secured within slot 54, and housing 12 is closed.

In operation, spring 20 pressingly forces member 18 in the direction of arrow 38 while forcing member 16 in the direction of arrow 40. The cooperative and respective attachment of end pieces 62 and 64 to members 18 and 16, cause cable portions 58 and 60 to be forced and/or moved toward each other (e.g., in opposite directions), thereby automatically compensating for and/or eliminating any slack or looseness in cable 12. The force provided by spring 20, thus provides the necessary and/or desired tension or tautness within cable 12.

To actuate device 80, actuator 82 pulls and/or forces cable portion 58 in the direction of arrow 40. This force causes member 18 to slidably move within member 16 in the direction of arrow 40 until member 18 contacts or abuts ridges 47, 49, thereby compressing spring 20. Once member 18 abuttingly resides against ridges 47, 49, the force provided by actuator 82 is fully or "solidly" transferred to assembly 16 which slidably moves within channel 25 in the direction of arrow 40.

This force and/or movement is transferred to cable portion 60, by way of end piece 64, thereby causing device 80 to desirably actuate. Once actuator 82 is released, spring 20 expands and members 16, 18 slidably return to their original positions, thereby continuing to provide and/or maintain the desired tension within cable 12. The rounded edge 72 of member 18 allows member 18 to pivot with respect to members 46, 48 while continuing to slide smoothly and freely between members 46, 48.

It should be appreciated that apparatus 10 substantially and automatically compensates for any "slack" or looseness in a cable due to wear, stretching or manufacturing tolerance variances (e.g., variances in the length of cable 12 and/or portions 58, 60), by effectively removing any undesirable excess cable length and such "slack" or "looseness". It should be appreciated that the length of spring 20 and member 16 may be conventionally increased for systems or cables which are relatively more susceptible to stretching or which produce a greater length or amount of "slack" over time.

In other alternate embodiments, apparatus 10 may be used in combination with a non-actuating cable in a substantially similar manner and with substantially similar results. When used in combination with a non-actuating cable, housing 12 may be eliminated and/or modified, as member 16 is not required to be independently movable to account for and/or to operatively allow for cable actuation in such an assembly.

It is understood that the invention is not limited by the exact construction or method illustrated and described above but that various changes and/or modifications may be made without departing from the spirit and/or the scope of the invention.

What is claimed is:

1. A cable tensioning apparatus comprising:

a generally hollow housing;

a first member which is adapted to be coupled to a first portion of a cable, said first member being slidably movable within said housing in response to an actuation of said cable and including an inner surface having at least one inwardly projecting ridge;

a second member which is adapted to be coupled to a second portion of said cable, which is disposed within said first member and which slidably engages said inner surface, said second member being movable, in response to a pulling force being applied to said second portion of said cable, between a first position in which said second member is remote from said at least one inwardly projecting ridge and a second position in which said second member abuttingly engages said at least one inwardly projecting ridge, thereby allowing said pulling force to be transferred to said first portion of said cable and allowing said cable to be actuated; and a compression member which is coupled to said first member and to said second member, said spring being effective to force said first portion toward said second portion, thereby providing tension within said cable.

2. The apparatus of claim 1 wherein said compression member comprises a spring.

3. The apparatus of claim 2 wherein said second member has a rounded outer edge which slidably engages said inner surface and allows said second member to pivot relative to said first member.

4. The apparatus of claim 3 wherein said housing is generally cylindrical in shape.

5. The apparatus of claim 2 wherein said first and said second members each include a projecting portion which receives said spring and which cooperatively and substantially prevent said spring from bowing.

6. The apparatus of claim 5 wherein said at least one inwardly projecting ridge comprises a pair of ridges.

7. A cable tensioning apparatus comprising:

a housing having a generally cylindrical channel;

a first member which is adapted to be coupled to a first portion of a cable and which is movably disposed within said housing, said first member being movable in response to a pulling of said cable, thereby allowing said cable to actuate;

a second member which is coupled to a second portion of said cable and which is slidably disposed within said first member and is slidably movable relative to said first member in response to an actuation of said cable; and a spring which is compressibly attached to said first member and to said second member, said spring being effective to selectively force said first member and said second member in opposite directions after actuation of said cable, thereby maintaining tension within said cable.

8. The apparatus of claim 7 wherein said first member and said second member each include a projecting portion which receives said spring and which cooperatively and substantially prevent said spring from bowing.

9. The apparatus of claim 7 wherein said spring comprises a coil spring.

10. The apparatus of claim 7 wherein said housing further includes a pair of apertures through which said first portion and said second portion are disposed.

11. The apparatus of claim 7 wherein said first member comprises a pair of opposing ridge portions for limiting the movement of said second member relative to said first member.

* * * * *